US007729485B2

(12) United States Patent
Koskinen et al.

(10) Patent No.: US 7,729,485 B2
(45) Date of Patent: Jun. 1, 2010

(54) TELECOMMUNICATIONS NETWORK HAVING NUMBER PORTABILITY

(76) Inventors: Juha-Pekka Koskinen, Heinajoenkatu 13, FIN-13210, Hameenlinna (FI); Juha R. Vallinen, Tarmonkatu 6 D 49, FIN-33900, Tampere (FI)

( * ) Notice: Subject to any disclaimer, the term of this patent is extended or adjusted under 35 U.S.C. 154(b) by 1819 days.

(21) Appl. No.: 10/819,981

(22) Filed: Apr. 8, 2004

(65) Prior Publication Data

US 2005/0111641 A1    May 26, 2005

(30) Foreign Application Priority Data

Nov. 25, 2003    (GB)    ................................ 0327379.4

(51) Int. Cl.
*H04M 15/00*    (2006.01)
*H04M 7/00*    (2006.01)
(52) U.S. Cl. .............................. 379/115.01; 379/114.27; 379/115.03; 379/221.13; 455/406
(58) Field of Classification Search ............ 379/114.01, 379/114.03, 114.27, 114.28, 114.29, 115.03, 379/121.05, 127.03, 133, 134, 220.01, 221.08, 379/221.13, 221.14; 455/405–408, 461
See application file for complete search history.

(56) References Cited

U.S. PATENT DOCUMENTS

| 6,108,332 | A  | * | 8/2000 | Kasiviswanathan | ......... 370/360 |
| 6,438,219 | B1 |   | 8/2002 | Karau et al. | |
| 2003/0186676 | A1 | * | 10/2003 | Ogman et al. | ............... 455/403 |
| 2004/0019539 | A1 | * | 1/2004 | Raman et al. | ................. 705/29 |
| 2004/0043756 | A1 | * | 3/2004 | Haukka et al. | .............. 455/411 |
| 2004/0133685 | A1 | * | 7/2004 | Jaaskela et al. | ............. 709/227 |
| 2004/0203641 | A1 | * | 10/2004 | Hazlewood | .............. 455/414.1 |
| 2005/0111640 | A1 | * | 5/2005 | Moisey et al. | ............ 379/114.2 |

FOREIGN PATENT DOCUMENTS

| EP | 1 278 382 A1 | 1/2003 |
| WO | WO 01/03446 A1 | 1/2001 |
| WO | WO 02/054786 | 7/2002 |

* cited by examiner

*Primary Examiner*—Quoc D Tran

(57) ABSTRACT

A system and method of monitoring number portability in a communication system, comprising transmitting ported-out information to a network element are disclosed. The system includes an originating network and a recipient network. The originating network includes a first network element for establishing a call to a ported-out subscriber and for transmitting ported-out information.

25 Claims, 3 Drawing Sheets

TELECOMMUNICATIONS NETWORK HAVING NUMBER PORTABILITY

FIELD OF INVENTION

The present invention relates to number portability in telecommunication networks, and particularly but not exclusively to third generation (3G) mobile communication networks.

BACKGROUND OF INVENTION

It is desirable in mobile communications networks for a user subscribing to a given operator to be able to change operators without the need for changing his phone number. For example, a business user would not wish to change operators if that change meant informing his customers of a new phone number, and producing new business cards, advertisements and so on showing the new phone number. Similarly, it would be inconvenient for a personal user to have to inform his friends and family of a new phone number each time he wished to change operator.

As a result of this, so-called "number portability" (NP) is now a basic feature of mobile communications systems. This allows a user to subscribe to a new network, but maintain the number allocated in the original network. For network operators to be able to switch a phone number from an originating subscription network to a new (recipient) subscription network it is necessary for certain information to be transmitted from the originating subscription network to the recipient subscription network.

In both 2G and 3G systems, an operator identifier must be changed in order to correctly identify the recipient subscription network. In 2G systems, prefixes such as 040 or 050 are used as operator identifiers to identify particular operators. An individual subscription to a network is requested by the operator identifier, e.g. 040, followed by a unique number. In 3G networks, the operator identifier is instead a postfix, such as @sonera.fi or @radiolinja.fi. An individual subscription for a network is represented by, e.g., john.doe@sonera.fi. In any number portability operation, the prefix or the postfix must be translated from the originating subscription network to the recipient network.

In all-IP (internet protocol) networks (such as 3G networks) number portability is soon to be standardised. The basic operation proposed is similar to that used in GSM (2G) systems.

In summary, a number portability (NP) database is queried during a session initiation phase. A mobile number portability database (MNP-DB) query determines if a subscriber has a new address, i.e. has been "ported out". Depending on the scenario, this query is performed using the Serving Call State Control Function (S-CSCF) or the Interrogating Call State Control Function (I-CSCF). The MNP-DB query may be performed in the originating network (direct routing) or the recipient network (indirect routing). The NP is done by using MNP-DB query (to find out if the subscriber is ported e.g. has new address) in S- or I-CSCF depending on the selected scenario.

In 2G networks, it is possible for network operators to charge users for the NP service. The 2G solution for charging of NP requires a mobile switching centre (MSC) to generate the relevant charging data. An indication that porting has taken place is inserted into the appropriate charging data records (CDRs) by the MSC.

General charging operations in 3G networks have now been standardised. Two separate charging architectures may be used: off-line and on-line. Off-line charging provides a charging process where charging information does not affect, in real time, the service rendered, whereas on-line charging provides a charging process where charging information can affect, in real time, the service rendered, and it can therefore directly interact with the session or service control.

The postpaid and prepaid charging methods known from 2G networks also apply in 3G networks. Postpaid requires a user to pay for network usage after it has taken place, usually by way of a monthly bill. Prepaid requires a user to pay for a service before it is actually used. Money is paid to a prepaid account, and is subsequently deducted from that account according to service usage.

3G charging can be effected by means of the Diameter protocol, an AAA (authentication, authorisation and accounting) protocol defined by the IETF. This is a session-based protocol and is extensible such that it is applicable to all supported services, and application-specific functionality can also be provided through an extension mechanism. All data delivered by Diameter is in the form of attribute value pairs (AVPs). AVPs are used by the base protocol to support features such as transporting of user authentication information, transporting of service specific authorisation information, and exchanging resource usage information which may be used for accounting purposes.

In both postpaid and prepaid charging systems, accounting data is transmitted between a network element within a user's subscription network and an accounting server. Accounting requests (ACRs) are sent from the network element to the accounting server, and corresponding accounting answers (ACAs) are sent back from the accounting server to the network element.

In postpaid charging situations these ACRs and ACAs are transmitted once a service request has been allowed, throughout a communication session. After the session has terminated, a final ACR/ACA pair is exchanged between the network element and the accounting server such that the session can be billed to the user.

In the prepaid situation an ACR is sent from a network element to an accounting server following a user's request for a service. The accounting server then checks whether the user has sufficient funds for the service requested, and responds with an ACA to the network element. If the service requested by the user is then accepted, ACRs and ACAs are transmitted throughout the session and money is periodically deducted from the prepaid account. On termination of the session, a final ACR is transmitted from the network element to the accounting server instructing the accounting server to terminate the deduction from the user's account. Finally, the accounting server responds to the network element with an ACA.

To date, no proposals have been made for how number portability could be monitored, or charged, in an all-IP network. It is therefore desirable to provide a solution which is suitable for monitoring number portability in 3G networks.

SUMMARY OF INVENTION

According to a first aspect of the present invention there is provided a method of monitoring number portability in a communication system, comprising transmitting ported-out information to a network element.

The ported-out information may be transmitted to a network element of an originating network or a recipient network. The ported-out information could be transmitted responsive to a request at an originating network for a call to be connected to a ported-out subscriber.

The ported-out information could include an indication that a called subscriber is ported-out, and/or a recipient network identity, and/or a ported-out subscriber identity.

The network element to which ported-out information is transmitted could suitably be a charging function. The network element could include pre-paid charging functionality.

The ported-out information could be transmitted as a SIP message. More specifically, the ported-out information could be transmitted as a SIP INVITE message.

Alternatively, the ported-out information could be transmitted as a Diameter protocol message, and more specifically as a CCR message.

The network element could suitably include post-paid charging functionality. The ported-out information could be transmitted as a SIP message or as a Diameter protocol message, and more specifically as an ACR message.

The network element to which ported-out information is transmitted could suitably be a charging function of a recipient network.

According to a second aspect of the present invention there is provided a method of charging for number portability in a communication system, comprising transmitting ported-out information to a charging function.

The ported-out information could suitably be transmitted to a charging function of an originating network or a recipient network. The ported-out information could suitably be transmitted responsive to a request at an originating network for a call to be connected to a ported-out subscriber.

The ported-out information could suitably include an indication that a called subscriber is ported-out, and/or a recipient network identity, and/or a ported-out subscriber identity.

The charging function to which ported-out information is transmitted could suitably include pre-paid charging functionality. The ported-out information could suitably be transmitted as a SIP message, and more specifically as a SIP INVITE message. Alternatively, the ported-out information could be transmitted as a Diameter protocol message, and more specifically as a CCR message.

The charging function could suitably include post-paid charging functionality. The ported-out information could be transmitted as a SIP message, or as a Diameter protocol message, and more specifically as an ACR message.

Charging could suitably take place from an originating network to a ported-out subscriber, or from a recipient network to a ported-out subscriber, or between an originating network and a recipient network.

According to a third aspect of the present invention there is provided a network element for monitoring number portability in a communication system, comprising means adapted to receive ported-out information.

The network element could suitably be a network element of an originating or a recipient network. The network element could suitably comprise a charging function.

According to a fourth aspect of the present invention there is provided a network element for monitoring number portability in a communication system, comprising means adapted to transmit ported-out information.

The network could further comprise means for establishing a call to a ported-out subscriber. The network could further comprise a serving call-state control function.

According to a fifth aspect of the present invention there is provided a communication system supporting number portability, including an originating network and a recipient network, the originating network including a first network element for establishing a call to a ported-out subscriber and for transmitting ported-out information, and a second network element for monitoring number portability and including means for receiving the ported-out information.

The recipient network could further include a third network element for monitoring number portability and for receiving the ported-out information. Optionally, the second and/or third network elements could comprise a charging function.

BRIEF DESCRIPTION OF DRAWINGS

The present invention will now be described by way of example with reference to the accompanying drawings, in which.

DETAILED DESCRIPTION

Figure 1:
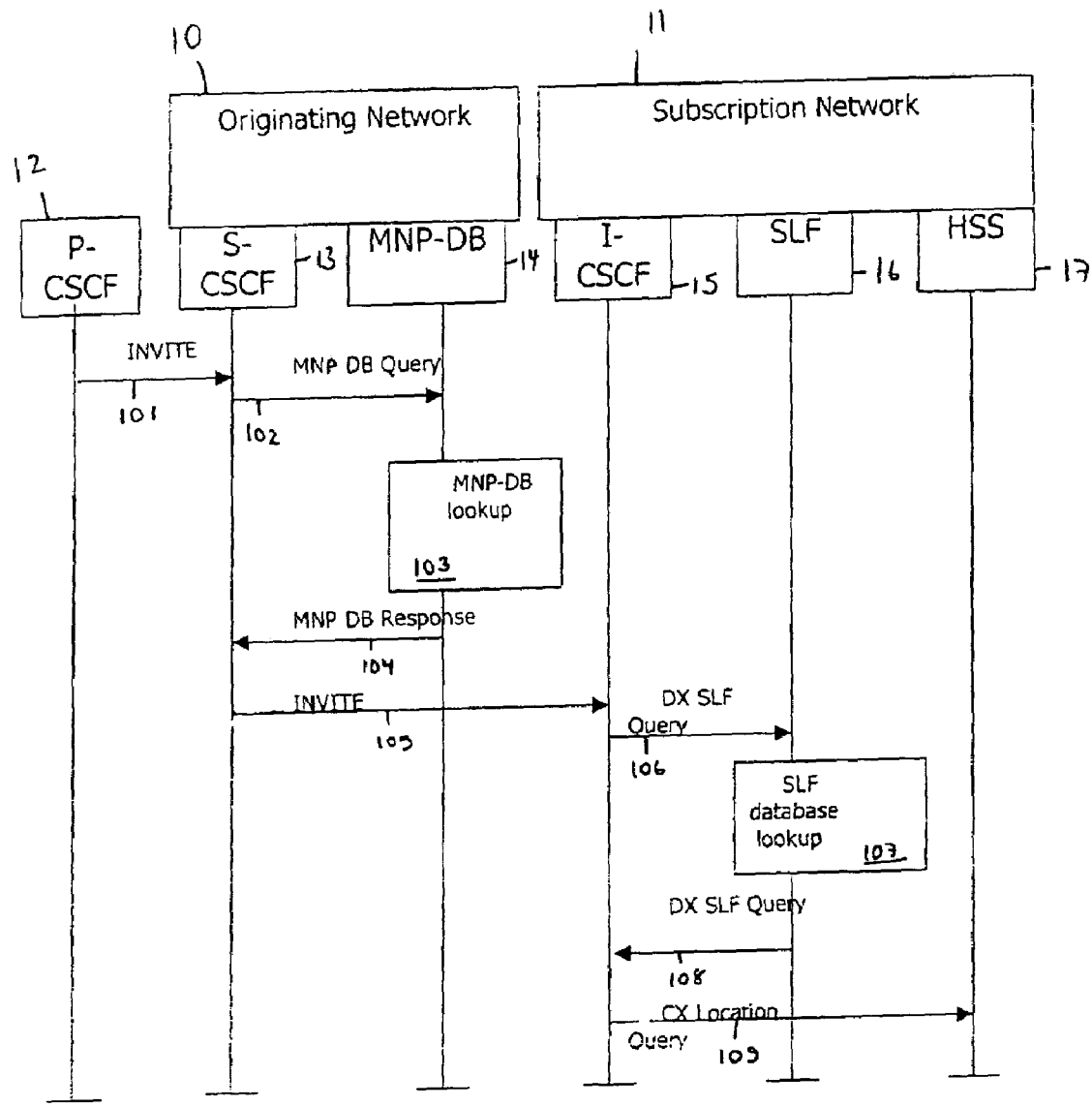
FIG. 1 shows steps involved in a number porting operation in accordance with an embodiment of the present invention.

In all of the figures, like reference numerals are used to refer to like features. The invention, and embodiments thereof, are described herein by way of reference to particular non-limiting examples.

FIG. 1 shows a known solution for directing a call to a ported mobile phone number from an originating network 10 to a recipient network 11. It is assumed that the porting of the number from the originating network to the recipient network has been carried out, and the appropriate porting information entered into the MNP-DB.

As illustrated in FIG. 1, a Proxy Call State Control Function (P-CSCF) 12 of the originating network transmits a session initiation protocol (SIP) INVITE message 101 to a S-CSCF 13 of the originating network. This is a standard message initiation in a network for establishing a call session in accordance with the SIP protocol.

Responsive to the INVITE message 101, a mobile number portability database (MNP-DB) query 102 is transmitted from the S-CSCF 13 to a MNP-DB 14, to determine if the "called" subscriber is ported out from the originating network. This querying step is known from second generation (2G) network solutions, and is a conventional step in handling the establishment of incoming calls in a network adapted to support number portability. The MNP-DB 14 then performs a look-up operation 103. The look-up operation determines if the called number is in the MNP-DB 14. The MNP-DB 14 responds to the S-CSCF 13 with a MNP-DB response 104. In the present example, it is assumed that the called subscriber is ported-out, and the MNP-DB 14 returns the identity of the ported-out subscriber, i.e. the recipient network.

In a conventional manner, a SIP INVITE message 105 is then sent from the S-CSCF 13 to an I-CSCF 15 of the recipient subscription network 11. The I-CSCF 15 then sends a DX SLF query 106 to a subscription locator function (SLF) 16 of the subscription network. The DX SLF query is a query to the subscription locator function to locate the next hop to route the INVITE message to the subscriber. The SLF performs a database look-up operation 107 to identify a home subscriber server (HSS) with which the subscriber is registered in the recipient network. A response 108, identifying the HSS, is then sent from the SLF 16 to the I-CSCF 15. The I-CSCF then sends a CX location query 109 to a HSS 17 of the subscription network, being the HSS with which the ported-out subscriber is associated. The CX location query is a normal query for requesting the location of the subscriber from the HSS. The subscriber is the called party or "B-party". Thereafter the SIP protocol may be completed to establish a call to the B-party subscriber.

Embodiments of the invention utilise the availability of ported-out information in the originating and/or recipient network, preferably for charging purposes and/or for compiling statistical analyses. Number portability information is available in the originating network. In summary, this is information about whether the subscriber number in the originating network is ported; and if it is ported the details of where it is ported to. The originating network thus has the information that this session is to be made towards a ported-out subscriber.

This number portability information is now available for charging purposes or for statistical purposes. This information may be inserted into subsequent messages for transmitting to the recipient subscription network. This is described by way of reference to three embodiments.

Figure 2:
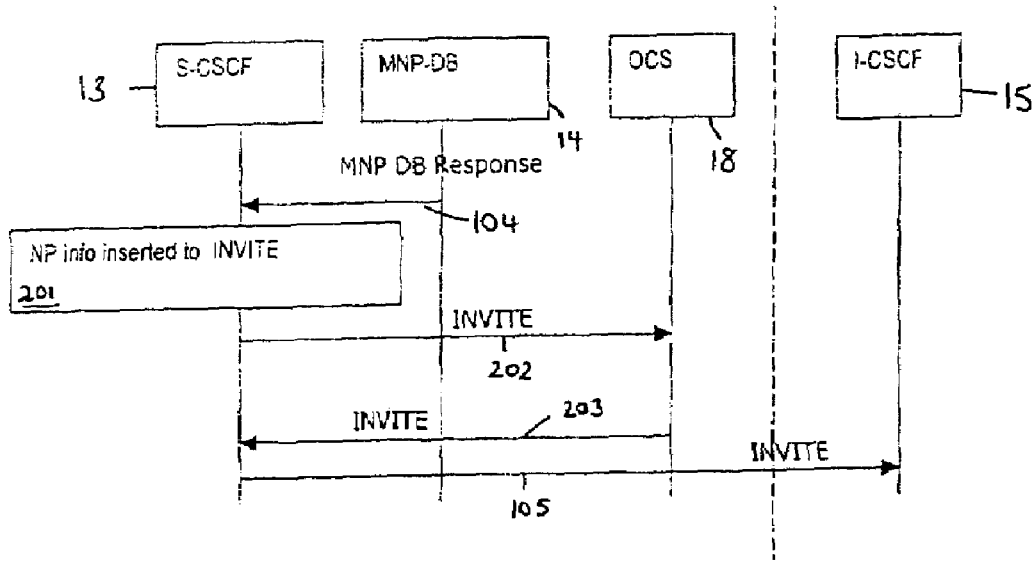
FIG. 2 shows a prepaid charging mechanism in accordance with an embodiment of the present invention.

FIG. 2 shows a number portability monitoring or charging solution in accordance with a first embodiment of the invention. In this particular embodiment there is provided a charging architecture consistent with the 3GPP (Third Generation Partnership Project) standard. The standard uses SIP messaging for charging, consistent with the signalling described in FIG. 1. The network elements 13, 14, 18 shown in FIG. 2 are each associated with the originating network from which a subscriber's mobile phone number has been ported to a new subscription network. Elements 13 and 14 are the same as shown in FIG. 1. In addition reference numeral 18 designates an online charging system (OCS). Reference numeral 15 denotes the I-CSCF of the recipient network as in FIG. 1.

In this embodiment, number portability information is made available to the on-line charging system (OCS) 18. After the MNP-DB response 104 is received at the originating network S-CSCF 13, the available NP information is inserted into a SIP INVITE message at 201 and an INVITE message 202 is transmitted to the originating network OCS 18. The INVITE message 202 preferably includes the identity of the ported-out subscriber, and the identity of the recipient network. The OCS responds with an INVITE message 203, and on receipt of this, the S-CSCF 13 transmits the further SIP INVITE message 105 to the subscription network I-CSCF 15 shown in FIGS. 1 and 2.

Thus the OCS of the originating network is provided with the ported-out information such that charging can be effected, if appropriate, in the originating network. More generally, the ported-out information is available for general purposes.

The embodiment of FIG. 2 is applicable to the solution as shown in FIG. 1, and the messaging signals 202, 203 shown in FIG. 2 are preferably transmitted between the signals 104 and 105 shown in FIG. 1.

The SIP INVITE message 202 includes "ported-out" information indicating that a mobile phone number has been ported from the originating network with which the S-CSCF 13 is associated. The ported-out information gives to the originating network the information that the original called address is not used, e.g. additional routing processing has been done. As this information is available it could be used for event based charging for example. In the terminated network (home of ported-out subscriber, i.e. the recipient network) this information may be used to match, for example, the recipient network operator-to-operator charges between the originating network (compare ported-out to ported-in). Thus, if operator A wishes to charge a value of x to operator B as a result of services (which may be NP and/or other services), and operator B wishes to charge a value of y to operator A as a result of various services, the value |x−y| can simply be charged from one operator to the other by means of matching the charges between operators from the NP information that is made available in accordance with embodiments of the present invention. These charges may then optionally be passed on to subscribers by the operators. There is no limitation on the way in which an operator may use this information, but it is made available for charging purposes if required.

The SIP INVITE message 105 transmitted to the new subscription network contains adapted data such that the NP information within it is "ported-in". The new subscription network can collect and retain this NP information and use it for statistical or charging purposes for example. In this way, a user can be charged by the new subscription network following the porting of a mobile phone number to the new network. This is in accordance with known number portability techniques, as described in relation to FIG. 1.

It will be clear to a person skilled in the art of mobile communication technology that the number portability information need not be used for the purpose of charging, but may alternatively or additionally be used by the originating and/or the recipient network for other purposes, such as compiling statistical data concerning subscribers and their usage of the network(s).

The charging technique illustrated in the example of FIG. 2 is pre-paid, whereby the OCS 18 responds to the S-CSCF 13 before the INVITE message 105 is sent to the recipient network.

Figure 3:
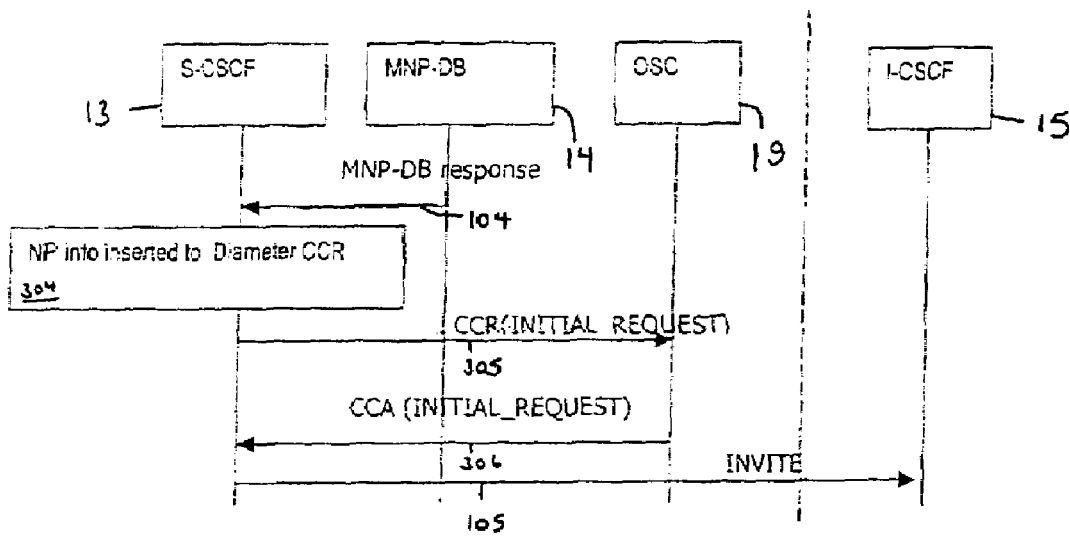
FIG. 3 shows prepaid charging mechanisms in accordance with further embodiments of the present invention.

FIG. 3 shows a pre-paid charging solution in accordance with a second exemplary embodiment of the invention. In FIG. 3, as with FIG. 1, the MNP-DB 14 is queried during the session initiation phase, and the MNP-DB response 104 is sent to the S-CSCF 13. The S-CSCF then inserts the ported-out information 304 into a Diameter CCR (Credit Control Request). As discussed above, information is transmitted in the form of AVPs in accordance with the Diameter protocol, thus the ported-out information 304 will define one or more AVPs which are transmitted within the CCR. This CCR 305 is then transmitted from the S-CSCF to an OSC (Online Service Controller) 19. The OSC 19 is equivalent to the OCS 18 of FIG. 2, but adapted to specifically support a Diameter protocol charging session.

Responsive to the CCR 305, and a successful credit check, the OSC 19 generates a corresponding CCA (Credit Control Assured) message 306, and transmits such back to the S-CSCF 13.

Thereafter the SIP INVITE message 105 inherently including the ported-out information is transmitted from the S-CSCF 13 to the I-CSCF 15 of the recipient subscription network. The INVITE message 105 indicates that the relevant mobile phone number has been ported in to the recipient network, as described hereinabove, and this information can then be retained in the recipient network for charging purposes or statistical purposes as required. Once again, this information is also available in the originating network.

In the example shown in FIG. 3, Diameter messages rather than the SIP messages of FIG. 2 are used for the transfer of charging information in a pre-paid arrangement. Ported-out information is inserted into the CCR message 305. Thus the arrangement of FIG. 3 is equivalent to that of FIG. 2, but with the signalling adapted to support a different protocol.

Figure 4:
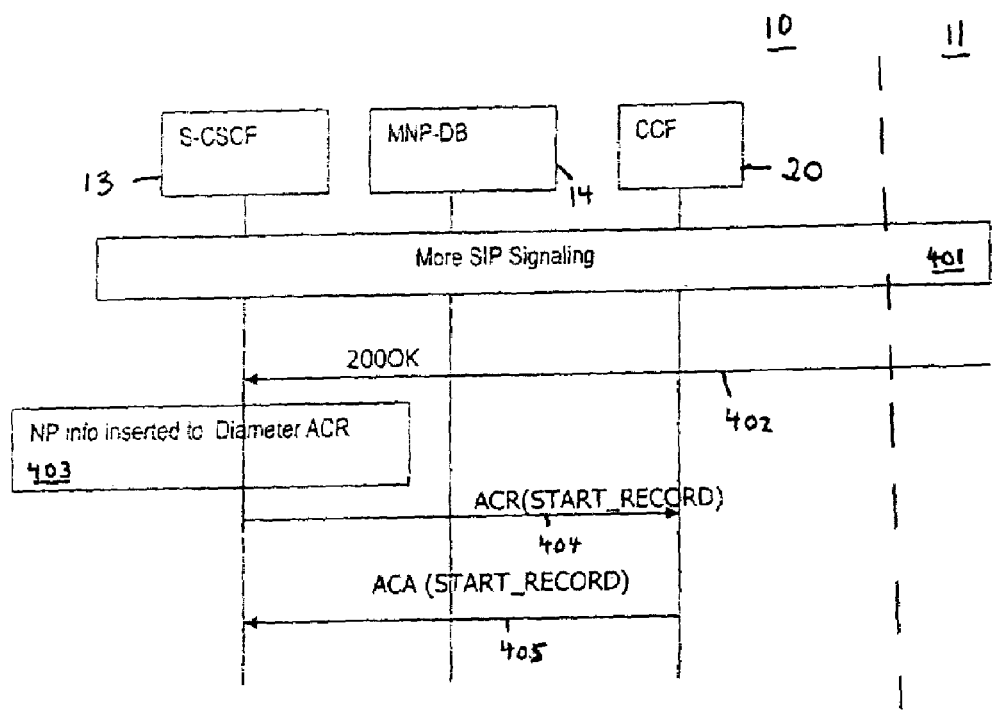
FIG. 4 shows a postpaid charging mechanism in accordance with a further embodiment of the present invention.

FIG. 4 shows a third embodiment of the invention. This embodiment illustrates a post-paid charging solution in accordance with the 3GPP standard. In this case, session initiation protocol (SIP) signalling takes place between the S-CSCF 13 and the MNP-DB 14 of the originating network.

As is further shown in FIG. 4, a charging collection function (CCF) 20 is also provided in the originating network.

SIP signalling 401 takes place between the subscription network and the recipient network, as is known in the art. The SIP signalling is diverted to the recipient network in accordance with the ported-out information derived from a query to the MNP-DB 14 during the initialisation of the session.

A 200OK message 402 is received at the S-CSCF 13 once the session is established.

In this embodiment of the invention, the S-CSCF inserts ported-out information 403 into a Diameter Accounting Control Request ACR (START-RECORD). The ported-out information is transmitted in the form of AVPs within the ACR. The ACR (START-RECORD) 404 is then transmitted to the CCF 20. An Accounting Control Answer ACA (START-RECORD) 405 is then transmitted from the CCF 20 to the S-CSCF 13, and charging information can be collected at the CCF 20 for subsequent post-paid billing to a user or for other purposes as discussed above.

It should be noted that FIG. 4 corresponds to FIG. 3, but with the provision of post-paid rather than pre-paid billing, hence the provision of CCR and CCA signalling in FIG. 3, and ACR and ACA signalling in FIG. 4.

In embodiments of the invention which use SIP messages to transfer ported-out information, the information may be included in an existing P-header. A P-header contains additional information inserted to a standard SIP message. Different kinds of P-headers are specified by 3GPP to enable IMS functionality. Alternative embodiments may include the ported-out information in a new P-charging-info header.

In embodiments which use Diameter Attribute Value Pairs (AVPs) to transmit ported-out information, an indication that a subscriber is ported-out, an identity of the ported-out subscriber and an indication of the ported-to-address may be included in an ACR message. More specifically, an AVP could suitably be used. For example, a ported-out indication could be transmitted as a redirected-information AVP, which might be an Enumerated AVP. This is specified by the IETF: Enumerated is derived from the Integer32 AVP, which is I 32 bit signed value, in network byte order. Base Format. The definition contains a list of valid values and their interpretation and is described in the Diameter application introducing the AVP. For example, 0 could be used to represent ported out; 1 could be used to represent ported in; and 2 to n could be used to represent other possible instances for future use. The ported-to-address could be sent as a redirected-address AVP, which could suitably be a UTF8 string AVP, and which contains the address in a case where a session is redirected from an originating network to a subscription network.

The applicant draws attention to the fact that the present invention may include any feature or combination of features disclosed herein either implicitly or explicitly or any generalisation thereof, without limitation to the scope of any definitions set out above. In view of the foregoing description it will be evident to a person skilled in the art that various modifications may be made within the scope of the invention.

The invention claimed is:

1. A method of monitoring number portability in a communication system, the method comprising:
   receiving ported-out information at an originating network, wherein the received ported-out information identifies a ported-out subscriber of the originating network and a recipient network;
   providing the ported-out information to a charging system configured to determine a charge for a call involving the ported-out subscriber in the recipient network; and
   transmitting a message to the recipient network, wherein the message indicates that the ported-out subscriber is ported-in to the recipient network.

2. The method of claim 1, further comprising querying a mobile number portability database to determine that the ported-out subscriber is ported-out from the originating network.

3. The method of claim 2, wherein the ported-out information is received at a serving call state control function of the originating network from the mobile number portability database.

4. The method of claim 2, wherein the mobile number portability database is queried in response to a request at the originating network for the call to be connected to the ported-out subscriber.

5. The method of claim 2, wherein the ported-out information further comprises an indication that a called subscriber is the ported-out subscriber.

6. The method of claim 1, wherein the message includes at least a portion of the ported-out information.

7. The method of claim 1, wherein the message comprises a session initiation protocol (SIP) INVITE message.

8. The method of claim 7, wherein the SIP INVITE message includes the ported-out information in at least one of a P-header or a charging information header.

9. The method of claim 1, wherein the ported-out information is provided to the charging system as part of a session initiation protocol message or a diameter protocol message.

10. The method of claim 1, wherein the message is provided by a serving call state control function of the originating network to an interrogating call state control function of the recipient network.

11. The method of claim 1, further comprising inserting the ported-out information into a credit control request, wherein providing the ported-out information to the charging system comprises providing the credit control request to the charging system.

12. The method of claim 11, further comprising receiving a credit control assured message from the charging system in response to the credit control request.

13. The method of claim 12, wherein the credit control assured message is received prior to transmitting the message to the recipient network such that the charging system is a pre-paid charging system.

14. The method of claim 1, further comprising:
   receiving a session established message from the recipient network;
   inserting the ported-out information into an accounting control request; and
   transmitting the accounting control request to the charging system.

15. The method of claim 14, wherein the ported-out information is transmitted as one or more attribute value pairs within the accounting control request.

16. The method of claim 14, further comprising receiving an accounting control answer from the charging system, and wherein the charge comprises a post-paid billing charge.

17. A network element for monitoring number portability in a communication system, the network element comprising:
   means for receiving ported-out information at an originating network, wherein the ported-out information identifies a ported-out subscriber and a recipient network;
   means for monitoring a call involving the ported-out subscriber in the recipient network; and
   means for determining a charge for the call based on the monitoring of the call.

18. The network element of claim 17, wherein the charge is based on a service provided by at least one of the recipient network or the originating network of the ported-out subscriber.

19. The network element of claim 17, wherein the ported-out information is received in response to a session established message received at the originating network of the ported-out subscriber.

20. The network element of claim 17, wherein the received ported-out information is incorporated in an accounting control request message.

21. The network element of claim 20, further comprising means for providing an accounting control answer in response to the accounting control request message.

22. A system for providing number portability, the system comprising:
   a first network element configured to establish a call involving a ported-out subscriber, wherein the ported-out subscriber is located in a recipient network;
   a second network element configured to
      receive ported-out information at an originating network of the ported-out subscriber, wherein the ported-out information identifies the ported-out subscriber and the recipient network;
      monitor the call; and
      determine a charge for the call based on the monitoring of the call.

23. The system of claim 22, wherein the second network element receives the ported-out information from the first network element.

24. The system of claim 22, wherein the first network element is further configured to provide the ported-out information to the recipient network.

25. The system of claim 22, wherein the first network element and the second network element are part of the originating network.

* * * * *